United States Patent
Omura

(10) Patent No.: US 10,727,549 B2
(45) Date of Patent: Jul. 28, 2020

(54) POWER SUPPLY DEVICE AND VEHICLE PROVIDED THEREWITH

(71) Applicant: SANYO Electric Co., Ltd., Osaka (JP)

(72) Inventor: Tetsuji Omura, Hyogo (JP)

(73) Assignee: SANYO ELECTRIC CO., LTD., Osaka (JP)

(*) Notice: Subject to any disclaimer, the term of this patent is extended or adjusted under 35 U.S.C. 154(b) by 208 days.

(21) Appl. No.: 15/564,385

(22) PCT Filed: Apr. 21, 2016

(86) PCT No.: PCT/JP2016/002133
§ 371 (c)(1),
(2) Date: Oct. 4, 2017

(87) PCT Pub. No.: WO2016/174855
PCT Pub. Date: Nov. 3, 2016

(65) Prior Publication Data
US 2018/0138559 A1 May 17, 2018

(30) Foreign Application Priority Data

Apr. 28, 2015 (JP) .................................. 2015-092340

(51) Int. Cl.
*H01M 10/613* (2014.01)
*H01M 10/625* (2014.01)
(Continued)

(52) U.S. Cl.
CPC ........... *H01M 10/613* (2015.04); *B60L 50/64* (2019.02); *B60L 50/66* (2019.02); *H01M 2/1077* (2013.01);
(Continued)

(58) Field of Classification Search
None
See application file for complete search history.

(56) References Cited

U.S. PATENT DOCUMENTS

2009/0239136 A1* 9/2009 Nagamine ........... H01M 2/1077
429/148
2011/0159348 A1* 6/2011 Park .................... H01M 2/1077
429/151
(Continued)

FOREIGN PATENT DOCUMENTS

CN 101558511 10/2009
CN 104379946 2/2015
(Continued)

OTHER PUBLICATIONS

International Search Report of PCT application No. PCT/JP2016/002133 dated Jul. 19, 2016.
(Continued)

*Primary Examiner* — Alix E Eggerding
(74) *Attorney, Agent, or Firm* — Wenderoth, Lind & Ponack, L.L.P.

(57) ABSTRACT

In order to enable the suppression of a decrease in screw fastening force due to a difference in linear expansion, a power supply device includes: a battery stacked body (11) including a plurality of stacked secondary battery cells (1); a fixing part configured to fix the battery stacked body (11); a fastening assistance plate (50) having the same linear expansion coefficient as the fixing part; a fixing plate (30) disposed between the fixing part and the fastening assistance plate (50), and having one surface on which the battery stack body (11) is disposed; and a plurality of screw connected members (40) passing through the fixing part, the fixing plate (30), and the fastening assistance plate (50). Each of the plurality of screw connected members (40) has a seating surface on which a frictional force operates, caused by an axial force, and the seating surface of each of the plurality of screw connected members (40) is in contact with the fixing plate (30) or the fastening assistance plate (50).

12 Claims, 18 Drawing Sheets

(51) Int. Cl.
  *H01M 10/647* (2014.01)
  *H01M 10/6556* (2014.01)
  *H01M 10/627* (2014.01)
  *H01M 2/10* (2006.01)
  *H01M 10/6554* (2014.01)
  *B60L 50/64* (2019.01)
  *B60L 50/60* (2019.01)
  *H01M 10/653* (2014.01)
  *H01M 10/6563* (2014.01)
  *H01M 10/6568* (2014.01)

(52) U.S. Cl.
  CPC ....... *H01M 2/1083* (2013.01); *H01M 10/625* (2015.04); *H01M 10/627* (2015.04); *H01M 10/647* (2015.04); *H01M 10/653* (2015.04); *H01M 10/6554* (2015.04); *H01M 10/6556* (2015.04); *H01M 10/6563* (2015.04); *H01M 10/6568* (2015.04); *H01M 2220/20* (2013.01)

(56) References Cited

U.S. PATENT DOCUMENTS

2014/0003880 A1   1/2014  Grooms, II
2016/0149180 A1*  5/2016  Tokoo ................. H01M 2/1077
                                                        429/120

FOREIGN PATENT DOCUMENTS

JP   2009-238389   10/2009
JP   2013-229182   11/2013
JP   2015-011819    1/2015
WO   2014/203694   12/2014

OTHER PUBLICATIONS

English Translation of Chinese Search Report dated Mar. 3, 2020 for the related Chinese Patent Application No. 2016800254483.8.

* cited by examiner

POWER SUPPLY DEVICE AND VEHICLE PROVIDED THEREWITH

CROSS-REFERENCE TO RELATED APPLICATIONS

This application is a U.S. national stage application of the PCT International Application No. PCT/JP2016/002133 filed on Apr. 21, 2016, which claims the benefit of foreign priority of Japanese patent application No. 2015-092340 filed on Apr. 28, 2015, the contents all of which are incorporated herein by reference.

TECHNICAL FIELD

The present invention relates to a power supply device, for example, used as a power source for a motor driving a vehicle of a hybrid car or an electric car, or used as a storage power having a large current used at home or in a factory. Further, the present invention relates to a vehicle provided with this power supply device.

BACKGROUND ART

In recent years, a power supply device mounted on a vehicle is required in order to provide the vehicle having a motor driving a hybrid car or an electric car. In such a vehicle, the power supply device has a comparatively high output for driving the motor. The power supply device having the high output is configured by connecting a lot of secondary battery cells in series. Since the secondary battery cells generate heat by charging and discharging, according to an increase of the number of the secondary battery cells, the amount of heat generation is increased. In the power supply device having a lot of the secondary battery cells, a heat radiation structure is necessary where the heat radiation of the secondary battery cells is efficiently heat-conducted and emitted.

In response to such a request, a power supply device having a heat radiation structure has been developed (for example, refer to Patent Literature 1). As shown in FIG. 15, this power supply device includes:

cooling plate 103 which incorporates heat exchanger 104 configured to forcibly cool by the heat of evaporation of a coolant circulating inside;

assembled batteries 102 which each connect a plurality of battery cells 101, and are fixed on this cooling plate 103; and frame structure body 105 which fixes cooling plate 103.

Thus, the power supply device forcibly cools assembled batteries by cooling plate 103.

CITATION LIST

Patent Literature

Patent Literature 1: Japanese Laid-Open Patent Publication No. 2009-238389

SUMMARY OF THE INVENTION

In a power supply device having a lot of secondary battery cells, in order to reduce a required space, an assembled battery is formed by assembling a plurality of secondary battery cells. The assembled battery has a pair of end plates at both side surfaces of a battery stacked body where the secondary battery cells are stacked, and are configured of fastening the pair of end plates each other by battery fastening members such as binding bars or the like. This assembled battery is mounted and fixed on the upper surface of a cooling plate in a state where the bottom surface of the assembled battery and the upper surface of the cooling plate are thermally connected. Concretely, for example, as shown in FIG. 16 and FIG. 17, the assembled battery is fixed such that screw connection members such as bolts 941 and nuts 942 are fastened in screw holes which are opened at end surfaces of binding bars 920 and end parts of cooling plate 930.

Here, since generally it is necessary that binding bars 920 strongly fasten secondary battery cells each other and corresponding strength is required, binding bars 920 are made of metal such as iron. On the other hand, cooling plate 930 is made of metal such as aluminum which is light and excellent in heat conduction to improve cooling efficiency.

However, in a case where binding bars 920 and cooling plate 930 are respectively made of different metals, linear expansion coefficients of binding bars 920 and cooling plate 930 are different. In a case where the difference of size change amounts by linear expansions of binding bars 920 and cooling plate 930 is large, seating surfaces of bolts 941 and nuts 942 which fix binding bars 920 and cooling plate 930, slide or slip, and then bolts 941 and nuts 942 may loosen. Especially, in the power supply device for a vehicle, when it is under a low or high temperature environment, such heat expansions easily occur, and then the problem due to loosening of the bolts easily occurs.

The present invention has been accomplished to solve such a problem. One of objects of the present invention is to provide a power supply device which suppress a decrease in fastening force of screw connection members due to a difference in linear heat expansion.

A power supply device as one aspect of the present invention includes: a battery stacked body including a plurality of stacked secondary battery cells; a fixing part configured to fix the battery stacked body; a fastening assistance plate having the same linear expansion coefficient as the fixing part; a fixing plate disposed between the fixing part and the fastening assistance plate, and having one surface on which the battery stack body is disposed; and a plurality of screw connected members passing through the fixing part, the fixing plate, and the fastening assistance plate. Each of the plurality of screw connected members has a seating surface on which a frictional force caused by an axial force operates, and the seating surface of each of the plurality of screw connected members is in contact with the fixing plate or the fastening assistance plate.

According to the above-mentioned configuration, the difference of size change amounts by heat expansions of the fixing part and the fastening assistance plate can be reduced. It is prevented that stress due to heat expansion is applied to a rotating direction of the screw connection members, and then loosening of the screw connection members due to heat expansion can be prevented.

DESCRIPTION OF EMBODIMENTS

Power supply device 100 according to one exemplary embodiment 1 of the present invention is illustrated in FIGS. 1 to 5. Power supply device 100 shown in these figures is an example of a power supply device for a vehicle. Concretely, this power supply device 100 is incorporated mainly in electric vehicles such as hybrid cars or electric cars, and is used as a power source for supplying electric power to a driving motor of the vehicle and driving the vehicle. The power supply device of the present invention can be used for electric vehicles other than hybrid cars or electric cars, and can be used for use other than the electric vehicle, where high output is required.

[Power Supply Device 100]

Figure 1:
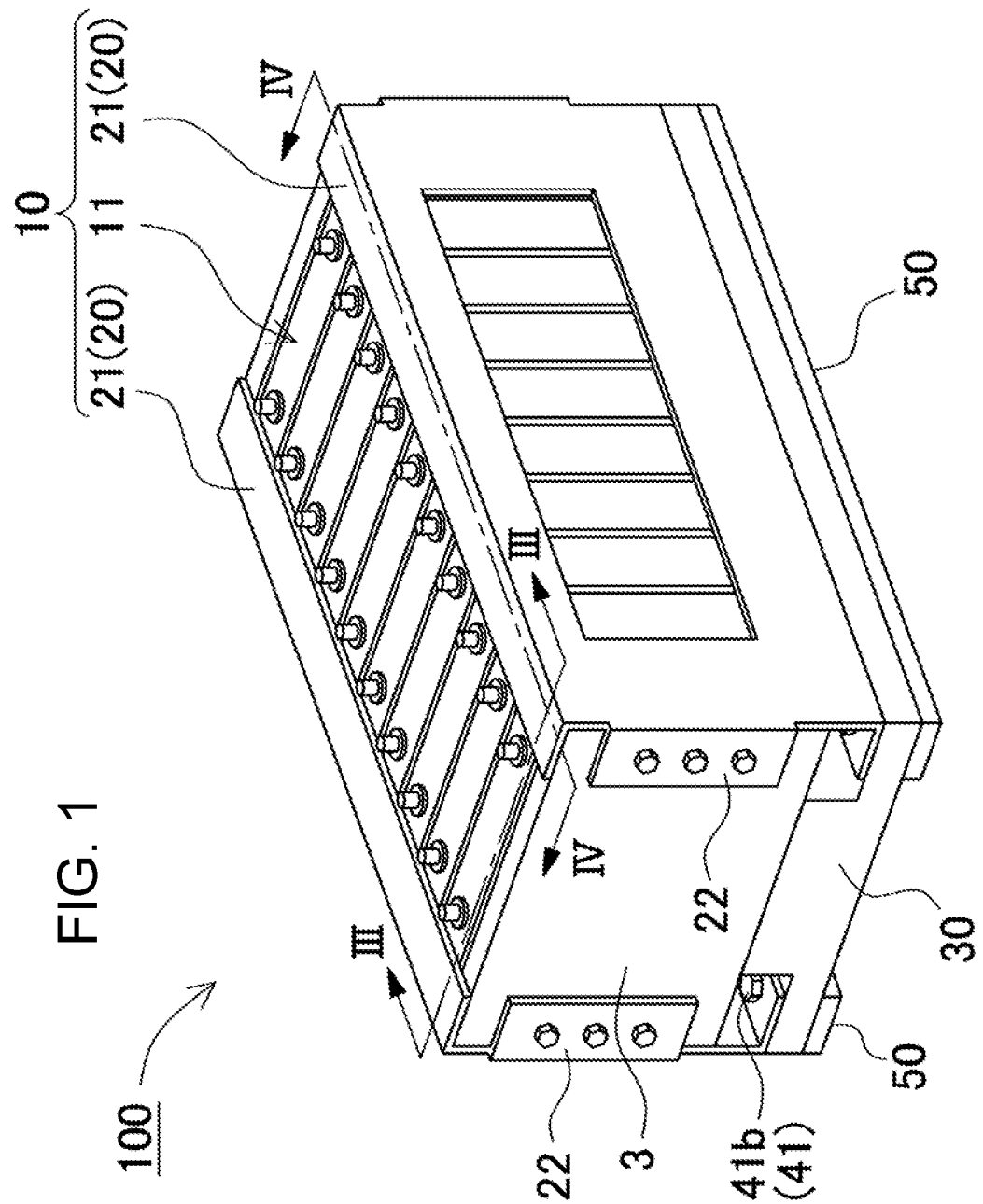
FIG. 1 is a perspective view of a power supply device according to one exemplary embodiment 1 of the present invention.
Figure 2:
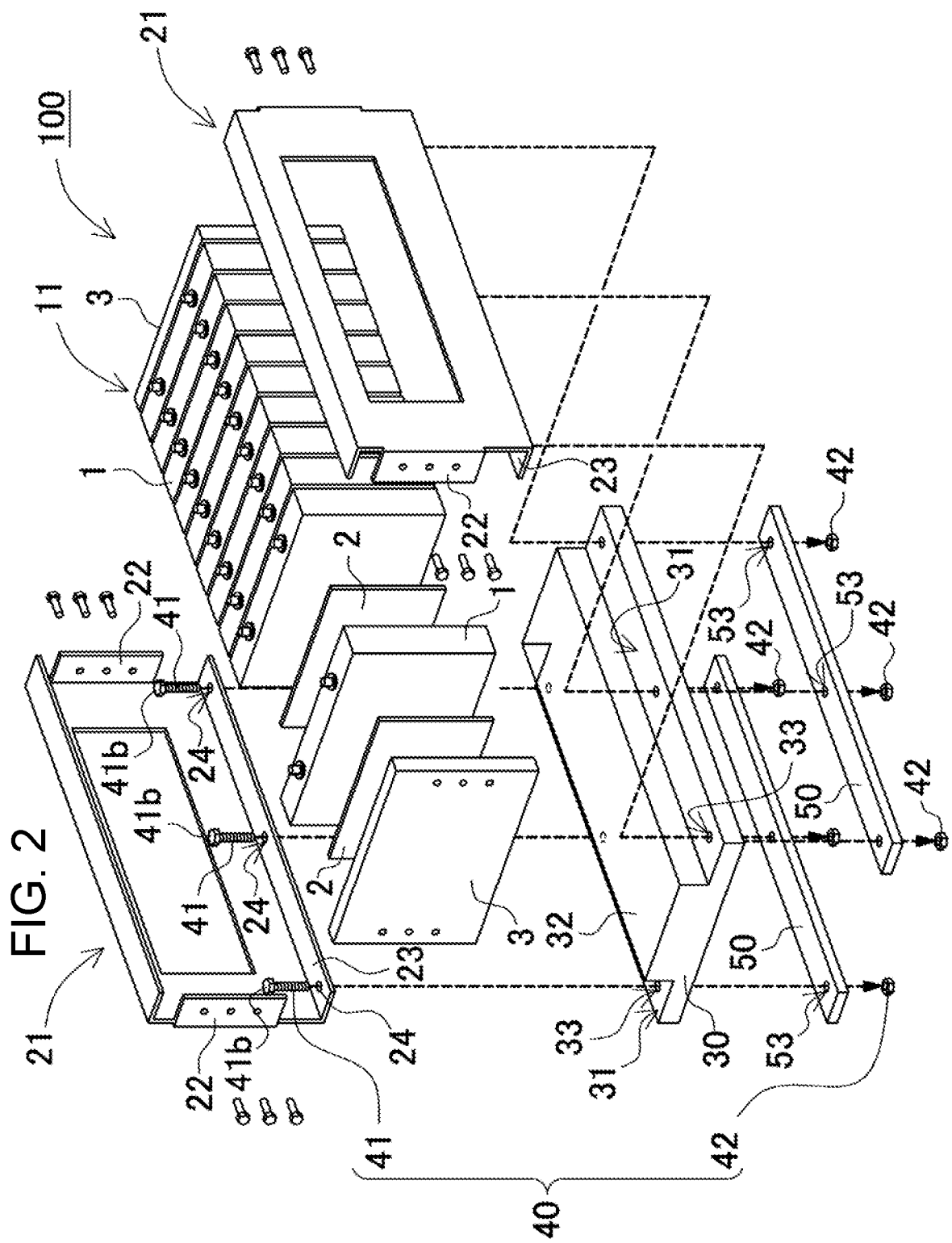
FIG. 2 is an exploded perspective view of the power supply device of FIG. 1.

Power supply device 100 shown in FIG. 1, FIG. 2, mounts assembled battery 10 on the upper surface of fixing plate 30, and fixes assembled battery 10 and fixing part 20 by screw connection. Assembled battery 10 includes battery stacked body 11 in which a plurality of secondary battery cells 1 are stacked, and battery fastening members 21 which fasten this battery stacked body 11. Secondary battery cells 1 has a board shape where the thickness is smaller than the width, and a rectangular main surface in the board shape. A plurality of secondary battery cells 1 are stacked. Further, secondary battery cells 1 are insulated from each other by insulating members such as separators 2 therebetween. In a state where secondary battery cells 1 and separators 2 are alternatively stacked, both end surfaces of battery stacked body 11 are covered with end plates 3. Battery fastening members 21 fix this pair of end plates 3 each other, and thus battery stacked body 11 is sandwiched and held between end plates 3. Battery fastening members 21 function as fixing part 20 which fixes assembled battery 10 to fixing plate 30.

[Secondary Battery Cells 1]

The outer can constitutes the outer shape of each of secondary battery cells 1, and is a rectangular shape where the thickness is smaller than the width. The outer can is formed in a bottomed pipe shape which is open upward, and its opening portion is closed by a sealing plate. An electrode assembling body is housed in the outer can. The sealing plate has the positive and negative electrode terminals and the gas exhaust valve between those electrode terminals.

The insulating member such as separator 2 made of plastic, is interposed between adjacent secondary battery cells 1 to insulate them each other. Also, the surface of secondary battery cell 1 can be covered with insulating member. For example, the surface of secondary battery cell 1 except for the electrode terminals, is covered with a heat shrink tube made of PET plastic or the like, and then the heat shrink tube is shrunk or contracted by adding heat. In this case, separators can be omitted.

[Battery Fastening Member 21]

As illustrated in FIGS. 1 and 2, battery fastening members 21 are disposed on the side surfaces of battery stacked body 11 on which end plates 3 are stacked on both ends, and fastens battery stacked body 11 by the pair of end plates 3 fixing. Battery fastening members 21 are formed in a size which covers the substantially entire surface of the side surface of battery stacked body 11.

Battery fastening member 21 are formed in a board shape which extends in the stacked direction of battery stacked body 11. In a state where battery fastening member 21 covers the side surface of battery stacked body 11, end plate fixing board 22 is formed by bending the end surface in the longitudinal direction of battery fastening member 21, and then battery fastening member 21 is fixed with end plate 3 fixing board 22 by screw or the like. Also, lower end bent board 23 is formed by bending the lower end of battery fastening members 21, and then this lower end bent board 23 is screw connected to the upper surface of fixing plate 30 by screw connection members 40, to fix battery stacked body 11 to fixing plate 30. Further, when necessary, an upper end bent board is formed by bending the upper end of battery fastening member 21, and the upper end bent board may cover partially the upper surface of battery stacked body 11.

Preferably, binding bars which are formed by bending metal boards, are used as battery fastening members 21. Also, it is necessary that battery fastening members 21 have adequate strength so as to sandwich and hole battery stacked body 11 for a long time. Thereby, high-tensile steel, general steel, stainless, aluminum alloy, magnesium alloy, or the like, and a combination of some of them can be used. Those are excellent in hardness and heat conduction. In the example of FIG. 1 or the like, battery fastening members 21 are made of Fe-based metal as a first metal.

Also, the battery fastening member can be in another shape. For example, it may has a shape in which both ends of an extended belt-shaped metal board are bent in a sectional U-shape. Here, the battery fastening member can be disposed at the upper surface of the battery stacked body other than the side surface thereof. Also, the substructure where the battery fastening member is fixed to the end plates, is not limited to screwing, a conventional fixing structure such as a rivet, caulking, welding, or adhesion can be used appropriately. Further, an opening portion of the separator can be provided between the adjacent secondary battery cells, so as to blown a cooling gas.

[Fixing Plate 30]

Fixing plate 30 is a member of which battery stacked body 11 is mounted on the upper surface. In the example of FIG. 1 or the like, fixing plate 30 as a heat radiating board is thermally connected to the lower surface of battery stacked body 11, so as to radiate heat from battery stacked body 11. Such a heat radiating board is made of a member which is excellent in heat conductivity. Here, fixing plate 30 is made of aluminum as a second metal different from the first metal. Also, in this example, a coolant is circulated inside the heat radiating board as a cooling plate which reduces the surface temperature thereof by heat exchange, to enhance heat radiation property further.

Figure 3:
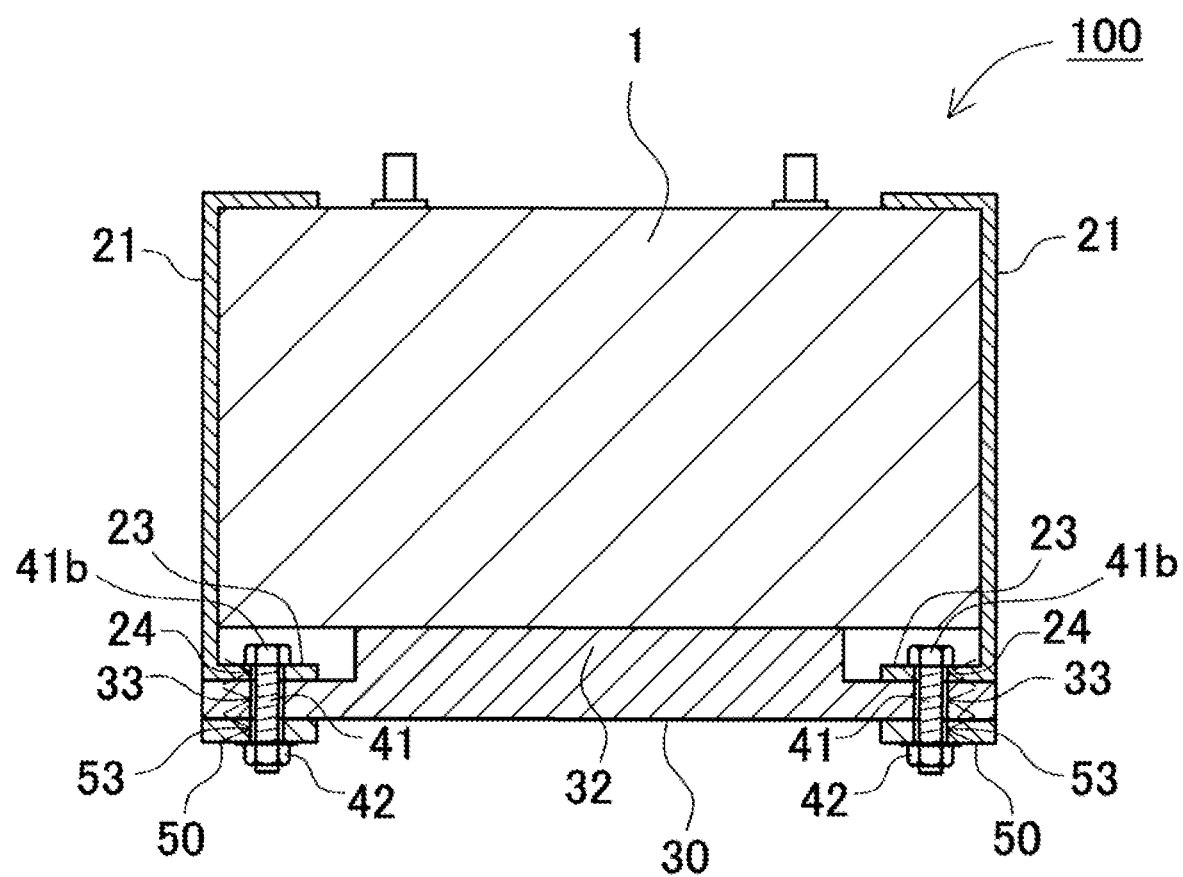
FIG. 3 is a vertical sectional view of the power supply device illustrated in FIG. 1 taken along line III-III.
Figure 4:
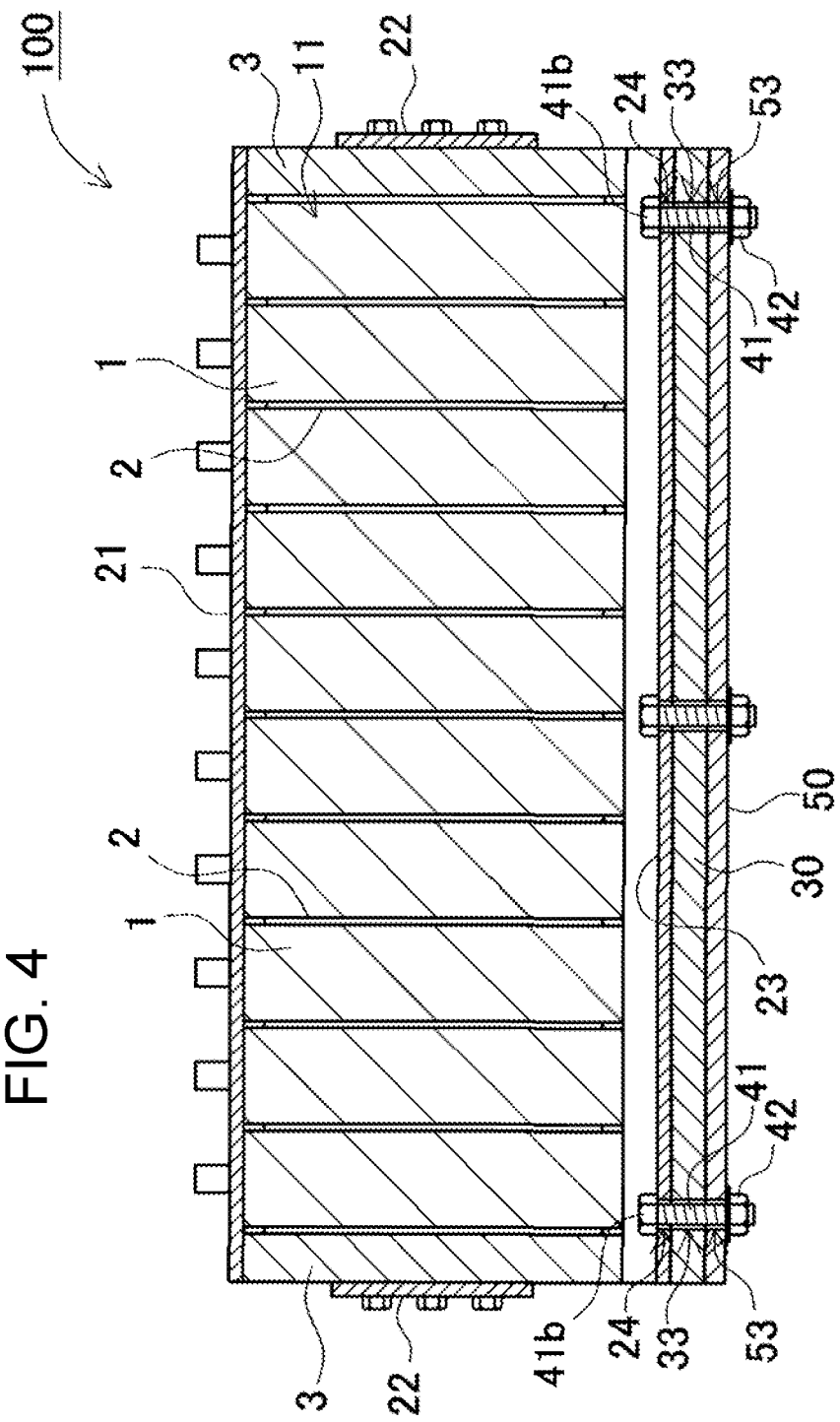
FIG. 4 is a vertical sectional view of the power supply device illustrated in FIG. 1 taken along line IV-IV.
Figure 5:
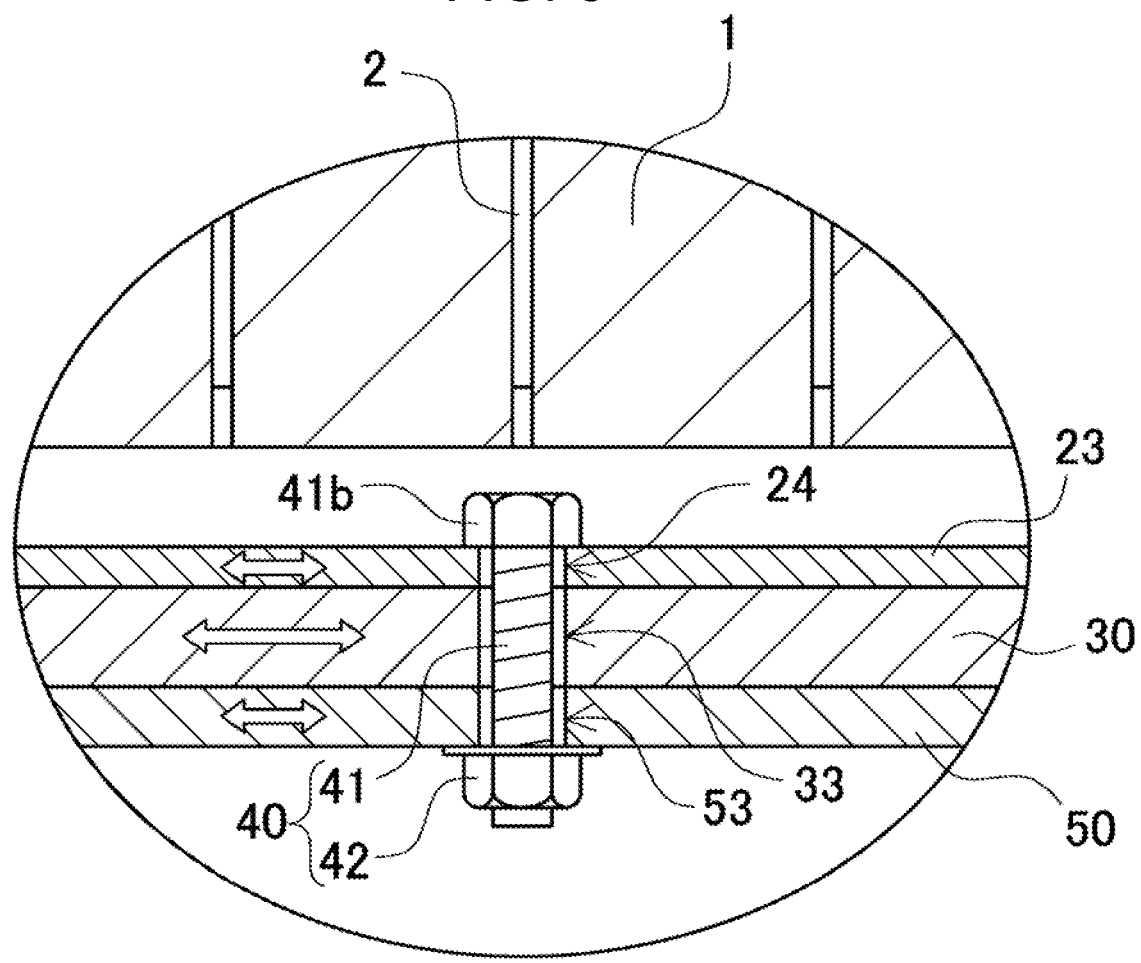
FIG. 5 is an enlarged sectional view of a main portion of FIG. 4.

As shown in FIG. 2 of the exploded perspective view and FIG. 3 of the sectional view, fixing plate 30 has step portions 31 at both side surfaces in the longitudinal direction thereof, and has projecting strip 32 at the middle portion in the longitudinal direction thereof. Projecting strip 32 is heat connected to the bottom surface of battery stacked body 11, and step portions 31 at both sides are fixed to lower end bent boards 23 of battery fastening members 21. Battery fastening members 21 and fixing plate 30 are screw connected each other by screw connected members 40. Therefore, lower fixing holes 24 are opened at lower end bent boards 23. Also, fixing through holes 33 are opened at the corresponding locations of fixing plate 30.

[Screw Connected Members 40]

Combinations of bolts 41 and nuts 42 are suitably used as screw connected members 40. Bolts 41 have bolt heads 41b respectively. Preferably, screw connected members 40 are made of fourth metal having a linear expansion coefficient equal to that of the first metal. In this example, bolts 41 and nuts 42 are made of Fe-based metal.

In the above-mentioned configuration, battery fastening member 21 which needs strength, is made of Fe-based metal. Fixing Plate 30 which needs light weight and high heat conductivity, is made of metal having light weight and high heat conductivity, such as aluminum or the like. Therefore, battery fastening member 21 and fixing plate 30 are made of different metals respectively, and then linear expansion coefficients of battery fastening member 21 and fixing board 30 are different. In a case where the difference of size change amounts by heat expansions of battery fastening member 21 and fixing plate 30 is large, seating surfaces of bolts 41 and nuts 42 which fix battery fastening member 21 and fixing plate 30, slide or slip, and then bolts 41 and nuts 42 may loosen.

Figure 18:
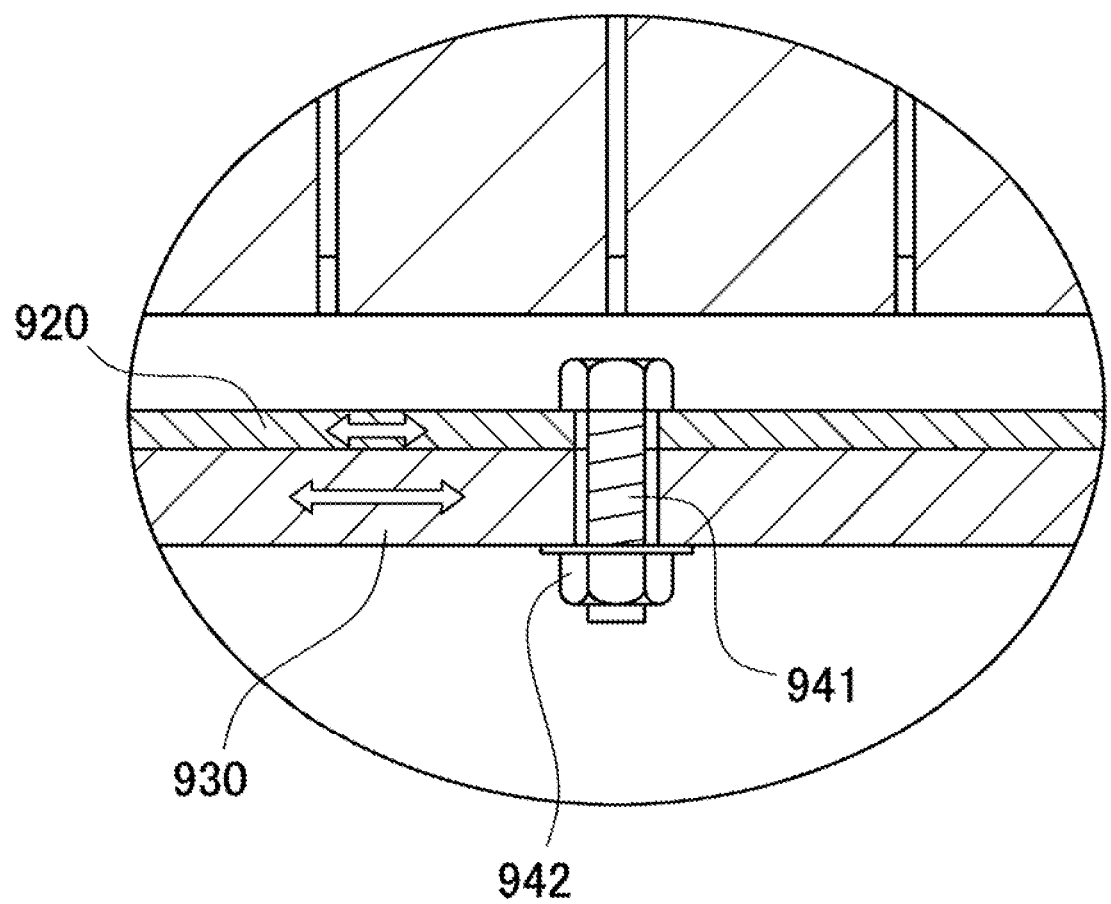
FIG. 18 is an enlarged sectional view of a main portion of FIG. 17.

Concretely, as shown in FIG. 18, when the iron board and the aluminum board are screw connected, as the result in which the surfaces of the iron board and the aluminum board are displaced, the force rotating the bolts 41 is applied, and then seating surfaces of bolts 41 at the side of the aluminum board Al and nuts 42, rotate in the loosening direction by sliding or slipping, and loosening of bolts 41 and nuts 42 may occur. Loosening of screw courses rattling of the assembled battery and the fixing board. Also, when the fixing board is a heat radiating board, the thermal connection between the heat radiation and the fixing board becomes unstable, and then the performance of heat radiation decreases. Further, when the fixing board is a heat radiating board, cooling ability by coolant does not adequately show, and heat radiation from the secondary battery cells is not adequately carried out, to affect the reliability of the power supply device.

Especially, in the power supply device for a vehicle, in a case where it is under a high temperature environment or in a case where a large current is generated by pressing on the emergency break, the heat expansions easily occur due to heating the battery stacked body, to causes the bolts to loosen. However, when the bolts are screwed too tightly in order to enhance the fastening force of screw, the aluminum board may be damaged. Furthermore, when it is necessary to increase a contact area of the seating surface bolts in order to enhance the fastening force of screw, enlarging outside diameters of the bolts and nuts may hinder down-sizing of the power supply device, to decrease the space efficiency.

[Fastening Assistance Plates 50]

Therefore, in this exemplary embodiment, fastening assistance plates 50 are prepared which are configured of third metal having the same linear expansion coefficient as the first metal of battery fastening member 21. Then, fastening assistance plates 50 are disposed at the back surface side of fixing plate 30. In a state where fixing plate 30 is sandwiched between fastening assistance plates 50 and battery fastening members 21, fastening assistance plates 50 and battery fastening members 21 are screw connected by screw connection members 40 of bolts 41 and nuts 42. Assistance through holes 53 in fastening assistance plates 50 are opened at the corresponding locations to fixing through holes 33 which are opened in fixing plate 30. By this configuration, as shown in the enlarged sectional view of FIG. 5, even though linear expansion occurs, the rotating forces of bolts 41 are not applied as a result in which the same sliding or displacement occurs at two surfaces by stacking 3 sheets of plate members, that is, the surface between battery fastening members 21 and fixing plate 30, and the surface between fixing plate 30 and fastening assistance plates 50. Preferably, fastening assistance plates 50 and battery fastening members 21 are made of the same metal material such as Fe-based metal.

The above-mentioned fastening assistance plate 50 is disposed in at least one row-shape, and has a plurality of through holes through which the plurality of screw connected members 40 respectively pass. According to this configuration, fastening assistance plate 50 extends along the through holes which are arranged in one row, and linear expansions between arbitrary two ones among the plurality of screw connection members 40 provided at one fastening assistance plate 50, can be equal in fixing part 20 and fastening assistance plate 50.

Also, preferably, screw connection members 40 are made of metal which has the same linear expansion coefficient as battery fastening member 21 or fastening assistance plate 50. More preferably, screw connection members 40 are made of the same first metal as battery fastening member 21 or fastening assistance plate 50. By this, since the same kind of metals contact in the seating surfaces of bolts 41 or nuts 42, sliding does not occur because of the same heat expansions, and then the cause of loosening in fastening can be solved.

Thus, in the stacked metal plates fixed by screw, the metal plates at both end surfaces are made of the same kind of metal, and further screw connected members 40 contacting both of the end surfaces are also made of the same metal material. Therefore, even though linear expansion occurs, sliding which occurs at the both end surfaces or at the surfaces with the other kind of inserted metal plate, is absorbed or mutually canceled, and then the problem of loosening by such heat expansion can be solved.

Here, the above-mentioned embodiment has a fastening structure where battery fastening member 21, fixing plate 30, and fastening assistance plate 50 are fixed by bolts 41 and nuts 42, but a fastening structure is not limited to this fastening structure. For example, through screw cutting the through holes of battery fastening member 21, a structure can be fixed by only bolts 41 which are screw connected to the through holes Based on a configuration of the fastened assembled battery, battery fastening member 21 may be configured of comparatively thick plate member in order to enhance the strength. When thickness of battery fastening member 21 is large, since screw cutting is easily carried out, nuts 42 can be omitted in such a configuration. Also, in addition to bolts 41 and nuts 42, screw connected members 40 may include washers or the like. In such a configuration, fixing part 20 and fastening assistance plate 50 contact the washers, frictional force by rotating power is applied to the seating surfaces of the washers.

In the above-mentioned embodiment, in order to reduce the difference of size change amounts by heat expansions of fixing part 20 in contact with the seating surfaces of screw connected members 40, fastening assistance plate 50 is disposed between fixing plate 30 and screw connected members 40, and further can has another function. For example, in case of mounting the power supply device on a vehicle, a fixing structure is necessary which fixes the power supply device to a frame of the vehicle. When fastening assistance plate 50 is formed in a shape where it extends and projects from one surface of the power supply device, a fixing portion for fixing to the vehicle can be provided at a location other than the locations where screw connected members 40 pass through for fixing plate 30.

Embodiment 2

In the above-mentioned example, lower end bent boards 23 of a pair of battery fastening members 21 which respectively covers right and left surfaces of battery stacked body 11, are bent inward, that is, in a direction where those come near each other, to be fixed to fixing plate 30. This structure has an advantage of down-sizing of the power supply device, because of avoiding the width of battery stacked body 11 to become wide. However, this structure has an disadvantage in work efficiency at a time of screwing screw connected members 40. For example, some idea is necessary where bolts 41 are welded in advance at the back surface side of the plate member, or are caulked for fixing. Conversely, lower end bent boards 23 are bent outward, that is, in a direction where those go apart each other, and then work efficiency can be improved because of easily reaching screw connected members 40. Such a example as the embodiment 2 is shown in a sectional view of FIG. 6. Power supply device 200 shown in this figure, has battery stacked body 11, battery fastening members 21, and fastening plate 30B, in the same way as the embodiment 1. In battery fastening members 21, lower end bent boards 23 are bent in the outward direction, and fixing through holes 33 are opened at this lower end bent boards 23, and fixing plate 30B contacts lower end bent boards 23. Battery fastening members 21 and fastening assistance plates 50B are fastened by screw connected members 40 which pass through assistance through holes 53B of fastening assistance plates 50B disposed at the back surface side of fixing plate 30B. In this configuration, screw connected members 40 are easily reached, and fastening work can be easily carried out. However, the width of fixing plate 30B becomes wide, this structure has a disadvantage with respect to downsizing.

Figure 6:
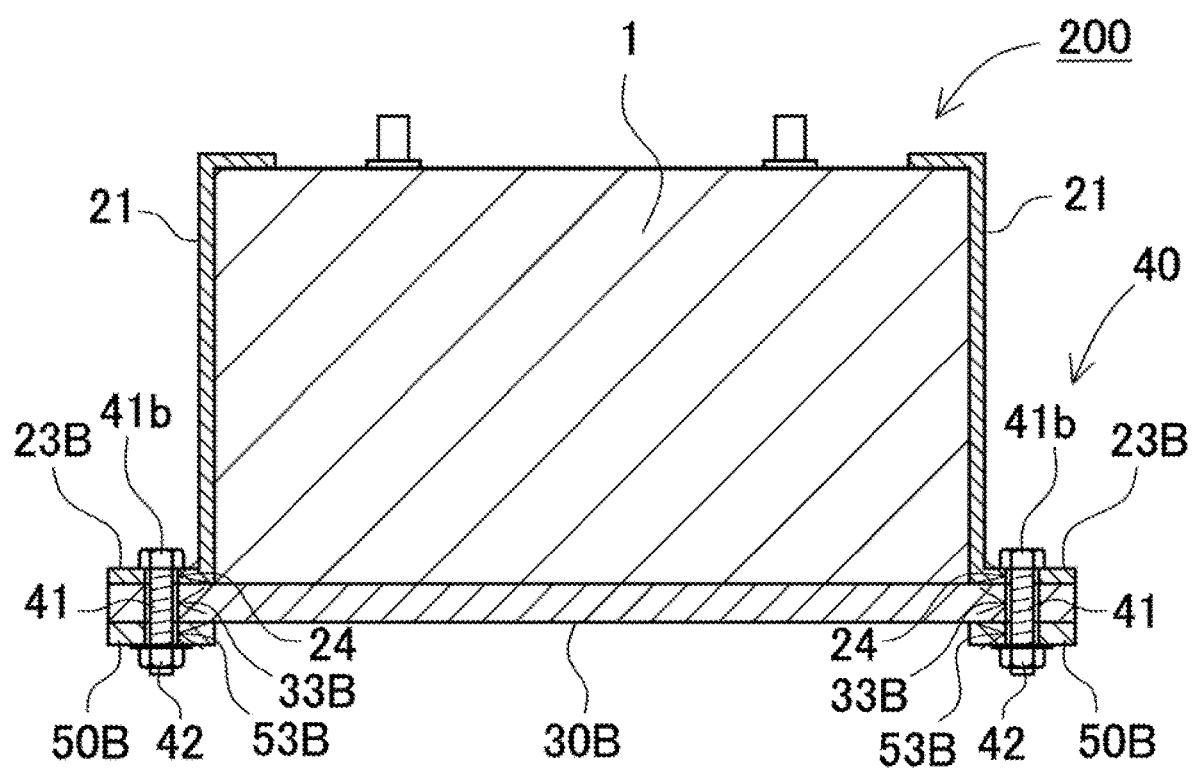
FIG. 6 is a vertical sectional view of a power supply device according to one exemplary embodiment 2.

In the examples of FIG. 3, FIG. 6, or the like, fastening assistance plates 50, 50B each have an enlonged shape which extends along fixing through holes 33 are opened at fixing plates 30, 30B. Thus, a size of the outer shape of the fastening assistance plate added as a separate member can be reduced, to prevent cost increase or weight increase. For example, in the example of FIG. 2, FIG. 3, or the like, fixing through holes 33 are provided at the right and left portions in the short direction of fixing plate 30. Corresponding to this, two of fastening assistance plates 50 are prepared. Each of fastening assistance plates 50 are disposed along the right and left at the bottom side of fixing plate 30. Assistance through holes 53 which are opened at fastening assistance plates 50, are aligned to fixing through holes 33 of fixing plate 30.

Embodiment 3

Figure 7:
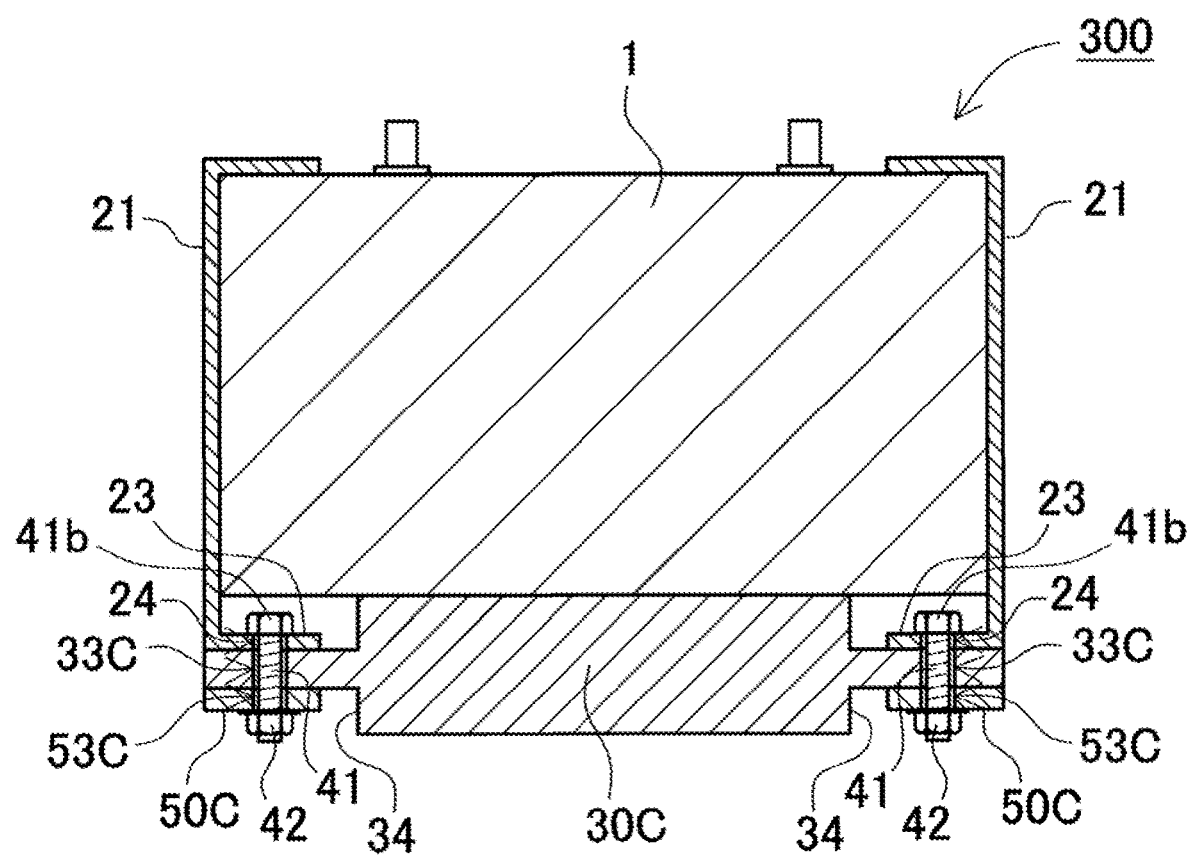
FIG. 7 is a vertical sectional view of a power supply device according to one exemplary embodiment 3.

Here, as shown in FIG. 3, since fastening assistance plates 50 are added, a thickness of the fastening portion is increased by the thickness of fastening assistance plates 50. Therefore, recesses are provided at regions where fastening assistance plates are disposed within the fixing plate, and then this structure prevents the fastening assistance plates from projecting from the surface of the fixing plate, and also prevents the fastening portion from being enlarged. Such a example as the embodiment 2 is shown in a sectional view of FIG. 7. In the example of power supply device 300 shown in this figure, end edges of fixing plate 30C in a longitudinal direction are cut in step shape, and then fixing plate 30C has a downward projecting shape in a sectional view. Fixing through holes 33C are opened at recesses 34 having the step shapes, and fastening assistance plates 50C are disposed and screw connected through assistance through holes 53C. A depth of step-shaped recess 34 is preferably equal to, or bigger than a thickness of fastening assistance plate 50C, and thus an increase of the thickness of the structure by adding fastening assistance plate 50C can be prevented. Further, this step-shaped recess 34 also works as positioning fastening assistance plate 50C.

Embodiment 4

Figure 8:
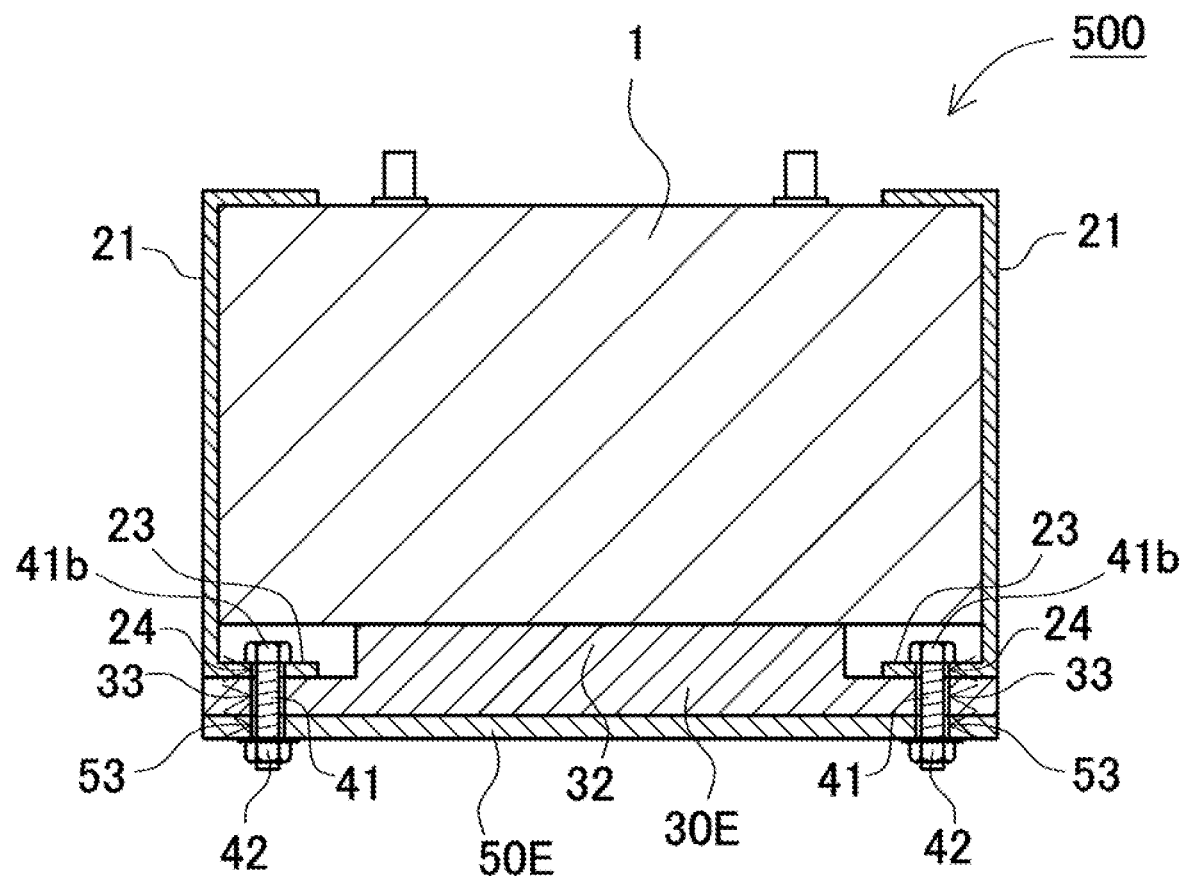
FIG. 8 is a vertical sectional view of a power supply device according to one exemplary embodiment 4 to improve a mechanical strength and heat radiation property.

The above-mentioned fastening assistance plate can be also configured to be formed integrally. Such a example as the embodiment 4 is shown in a vertical sectional view of FIG. 8. In the example of power supply device 500 shown in this figure, fastening assistance plate 50E as one sheet plate is disposed at the back surface side of fixing plate 30. Since this structure can be assembled by only positioning one large fastening assistance plate 50E, this structure is excellent in a view point of handling. Also, the mechanical strength of this structure is improved, since fastening assistance plate 50E is stacked on the entire surface or large area of fixing plate 30E. Further, a performance of heat radiation can be improved by using fastening assistance plate 50E as a heat sink. Conversely, cost increase of parts or enlargement in thickness by increasing in size of the fastening assistance plate, occurs. Among them, with respect to the thickness, this converse problem can be solved, for example, by making the thickness of the fixing plate thin.

Embodiment 5

Figure 9:
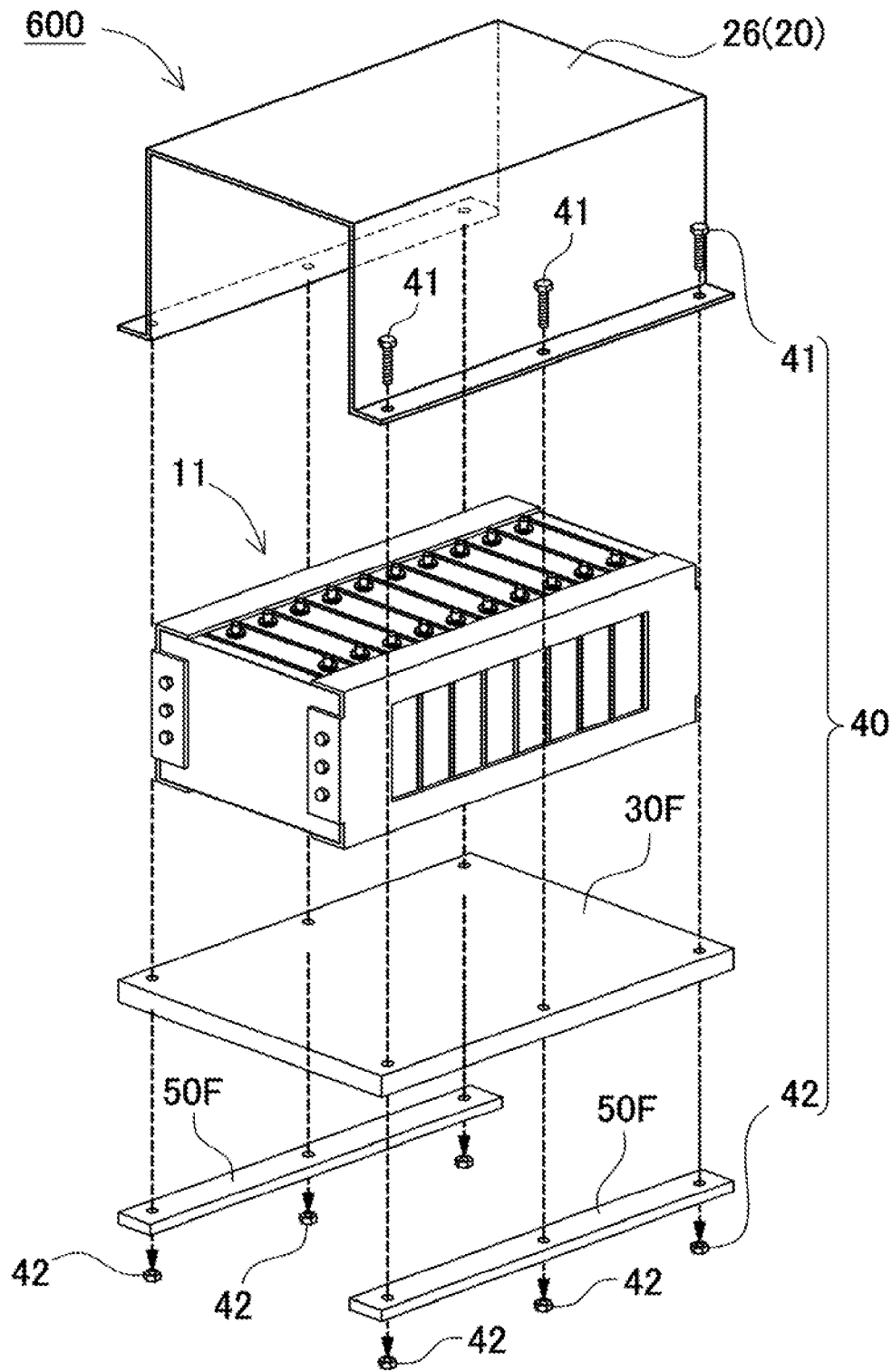
FIG. 9 is an exploded perspective view of a power supply device according to one exemplary embodiment 5.

In the above examples, the examples where the fixing part as the battery fastening member fastens the battery stacked body are explained. The present invention does not limit the fixing part to the battery fastening member, the fixing part can be other members. For example, when a fixing part other than the battery fastening member is provided which fixes the battery stacked body to the fixing plate, the present invention can be applied to the fastening structure where this fixing part and the fixing plate are fastened. Such a example as the embodiment 5 is shown in a perspective view of FIG. 9. Power supply device 600 shown in this figure has outer cover 26 which covers the upper surface of battery stacked body 11, and battery stacked body 11 is fixed such that outer cover 26 and fixing plate 30F sandwich and hold battery stacked body 11 from up and down. In this configuration, when outer cover 26 as fixing part 20 is made of material having the same linear expansion coefficient as fastening assistance plate 50F, or made of the same material as fastening assistance plate 50F, loosening of outer cover 26 and fixing plate 30F can be prevented in the same way as above described.

Embodiment 6

Figure 10:
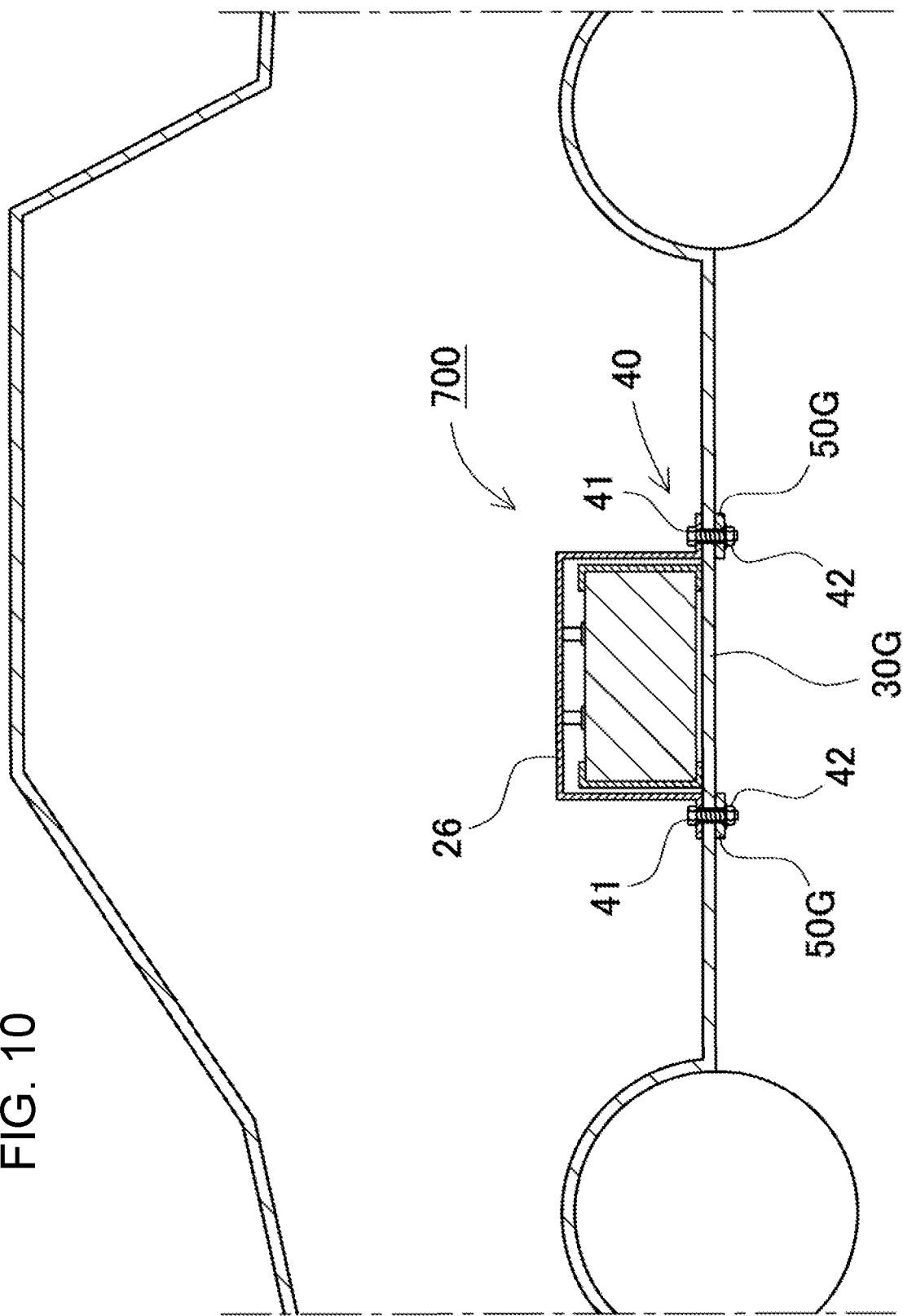
FIG. 10 is a vertical sectional view of a power supply device according to one exemplary embodiment 6.

In the above examples, the examples where the fixing plate is used as a heat radiation plate or a cooling plate, are explained. However, the present invention does not limit the fixing plate to a member for heat radiation or cooling, and can be applied to a fastening structure where the battery stacked body or the power supply device is fixed to an object. For example, in the power supply device for a vehicle, the present invention can be applied to a fixing structure where the battery stacked body or the power supply device is fixed to a vehicle. Such a example as power supply device 700 of the embodiment 6 is shown in a vertical sectional view of FIG. 10. In this example, in order to fix battery stacked body 11 to structure 30G of a chassis for a vehicle, structure 30G is sandwiched and held by outer cover 26 and fastening assistance plate 50, and is screw connected by the screw connection members. Also, in this configuration, in a state where battery stacked body 11 is fixed to structure 30G, loosening of bolts 41 caused by heat expansion can be prevented, and the reliability can be improved.

Embodiment 7

Furthermore, the present invention does not limit the fixing plate to a bottom plate on which the battery stacked body is mounted, and can be applied to a member which is fixed to the battery stacked body. Especially, the secondary battery cells which constitute the battery stacked body, generate heat by charge and discharging with large current, and the it is expected that heat expansion occurs. It is necessary to prevent fastening strength from being decreased, the present invention can be used suitably.

Figure 11:
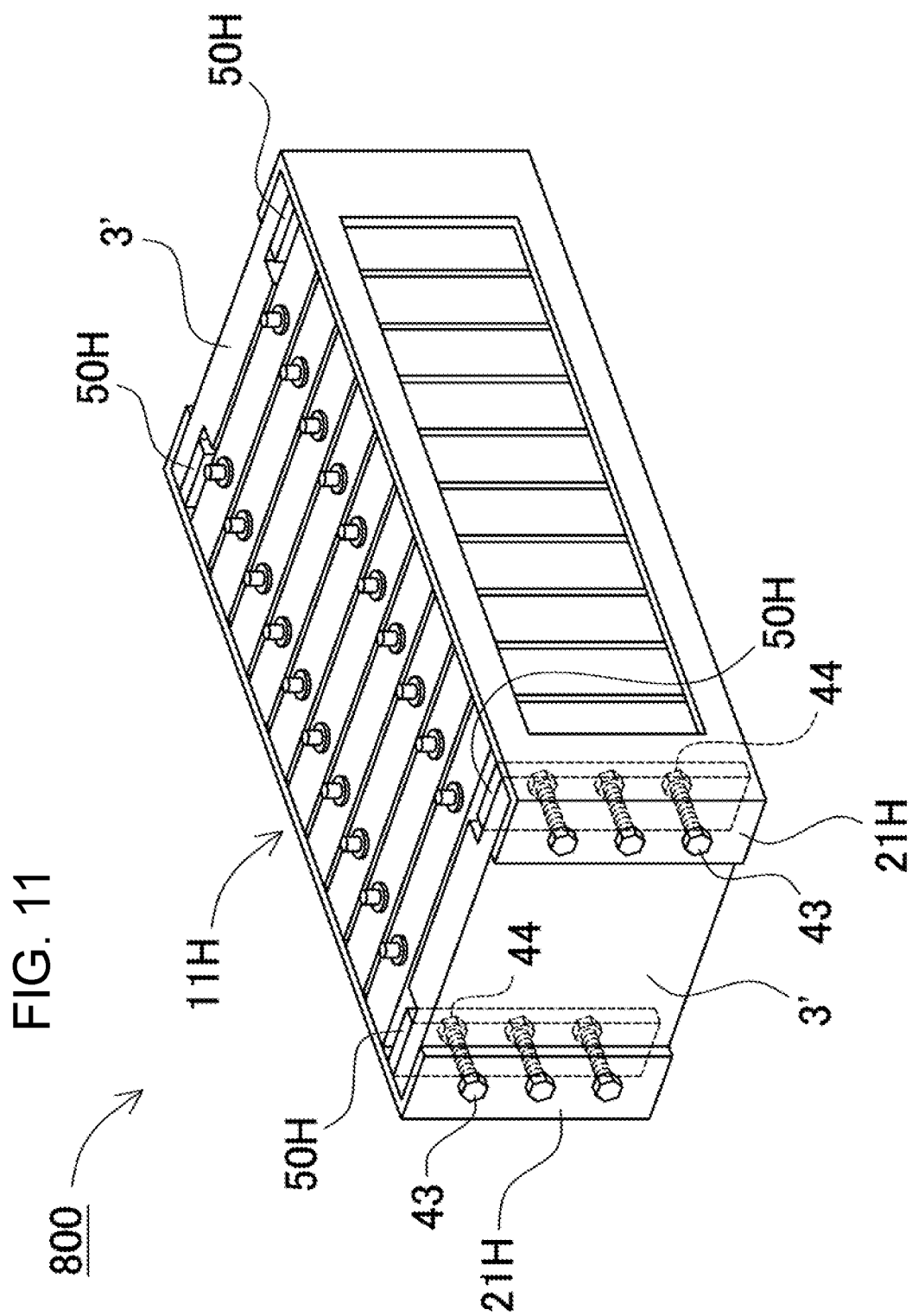
FIG. 11 is a perspective view of a power supply device according to one exemplary embodiment 7.
Figure 12:
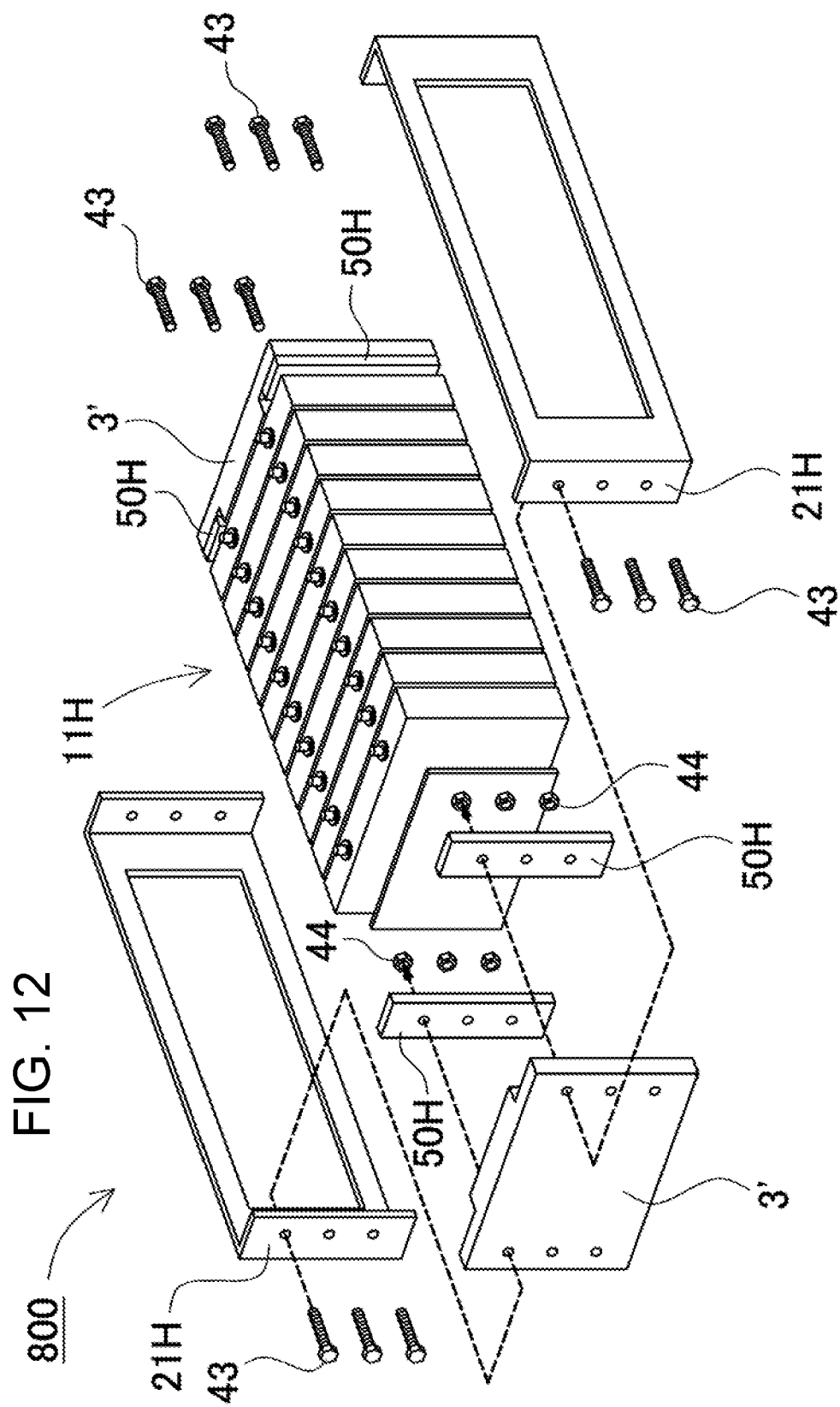
FIG. 12 is an exploded perspective view of the power supply device of FIG. 11.

For example, in a example of power supply device 800 as the embodiment 7 shown in a perspective view of FIG. 11 and an exploded perspective view of FIG. 12, the present invention is applied to a structure where battery fastening members 21H are fastened by screw connection to end plates 3'. In this example, end plates 3' (corresponding to fixing plate 30) are made of aluminum having excellent heat radiation property, and battery fastening members 21 are made of iron. Battery fastening members 21 are screw connected to end plates 3' by second bolts 43 and second nuts 44 as second screw connected members. Also, in this fastening structure, loosening caused by heat expansion can be solved by adding fastening assistance plates For example, fastening assistance plates 50H which extend vertically at the right and left portions of the back surface side of end plate 3', are disposed. Here, since recesses of step shapes are made at the right and left portions of the back surface side of end plate 3', increase of the thickness of end plate 3' even by stacking fastening assistance plate 50H can be prevented, and there is no enlargement of the entire length of battery stacked body 11H. Thus, in the fastening structure of the end plates and the battery fastening members, loosening caused by heat expansion can be solved by the simple structure of adding the fastening assistance plate, fastening strength of the battery stacked body can be kept, and the reliability can be improved.

As mentioned above, according to the embodiments of the present invention, loosening of the bolt caused by the difference of linear expansion coefficients can be suppressed. As a result, regardless of occurrence of heat expansion, fastening state can be maintained for a long time, the reliability of the fixing structure can be improved. Also, when those are applied to the fixing structure of heat radiation plate or cooling plate, thermal connecting state of the battery stacked body and the cooling plate or the like can be maintained stably, and cooling ability can be adequately shown.

The power supply device described above can be used for a vehicle-mounted power supply. Examples of a vehicle having a power supply device mounted include electric vehicles such as hybrid cars or plug-in hybrid cars driven by both an engine and a motor, or electric-motor driven automobiles such as electric automobiles only driven by a motor. The power supply device can be used for power supplies of these vehicles.

(Power Supply Device for Hybrid Automobile)

Figure 13:
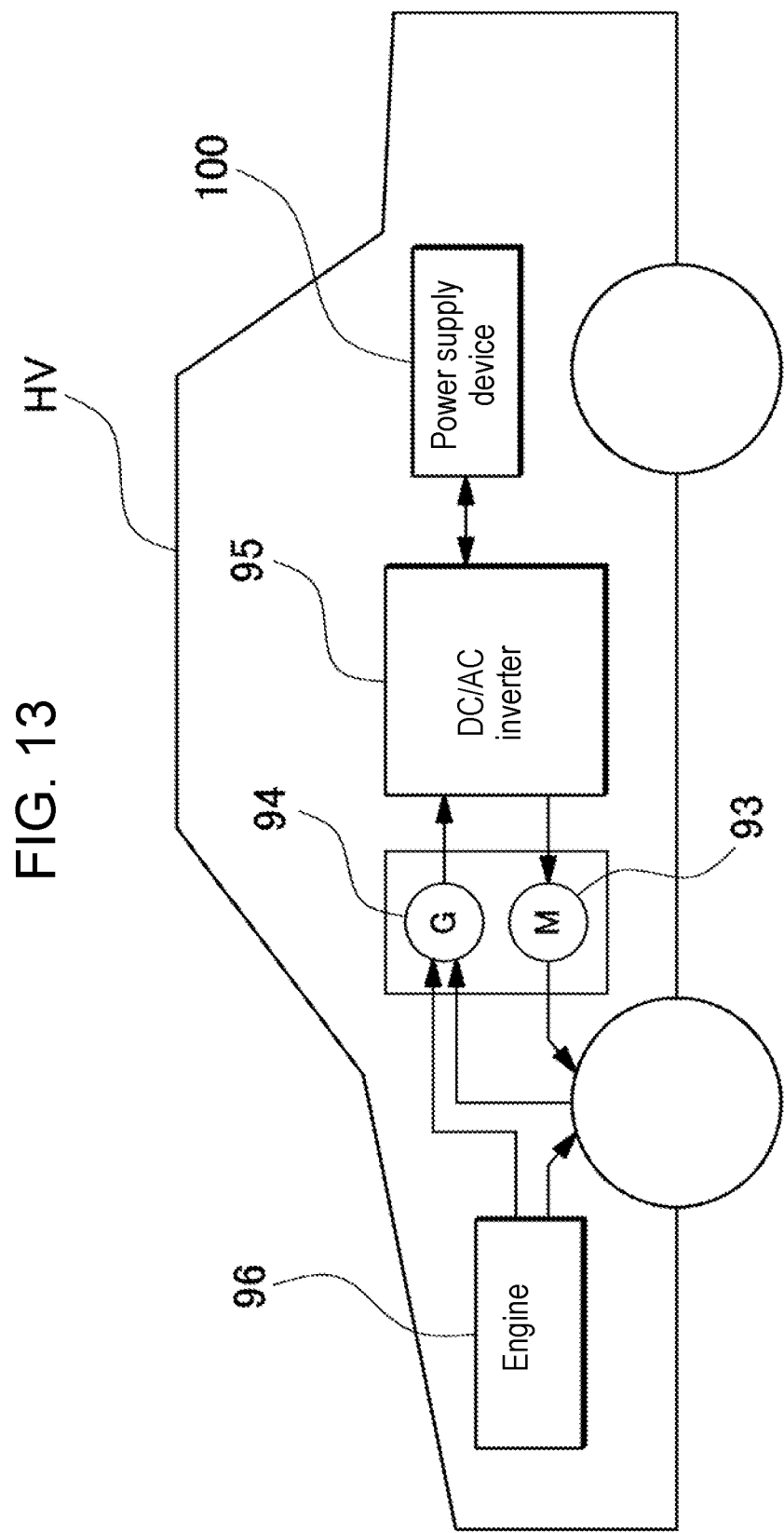
FIG. 13 is a block diagram showing an example in which a power supply device is mounted on a hybrid car driven by both an engine and a motor.

FIG. 13 shows an example in which a power supply device is mounted on a hybrid car driven by both an engine and a motor. Vehicle HV equipped with a power supply device that is shown in this drawing includes: engine 96 and motor 93 for travel that make vehicle HV travel; power supply device 100 for supplying power to motor 93; and power generator 94 for charging the battery in power supply device 100. Power supply device 100 is connected to motor 93 and power generator 94 via direct current (DC)/alternating current (AC) inverter 95. Vehicle HV travels by both of motor 93 and engine 96 while charging and discharging the battery of power supply device 100. Motor 93 is driven when the engine efficiency is low, for example during acceleration or low-speed travel, and makes the vehicle travel. Motor 93 receives power from power supply device 100 and is driven. Power generator 94 is driven by engine 96 or is driven by regenerative braking when the vehicle is braked, and the battery of power supply device 100 is charged.

(Power Supply Device for Electric Car)

Figure 14:
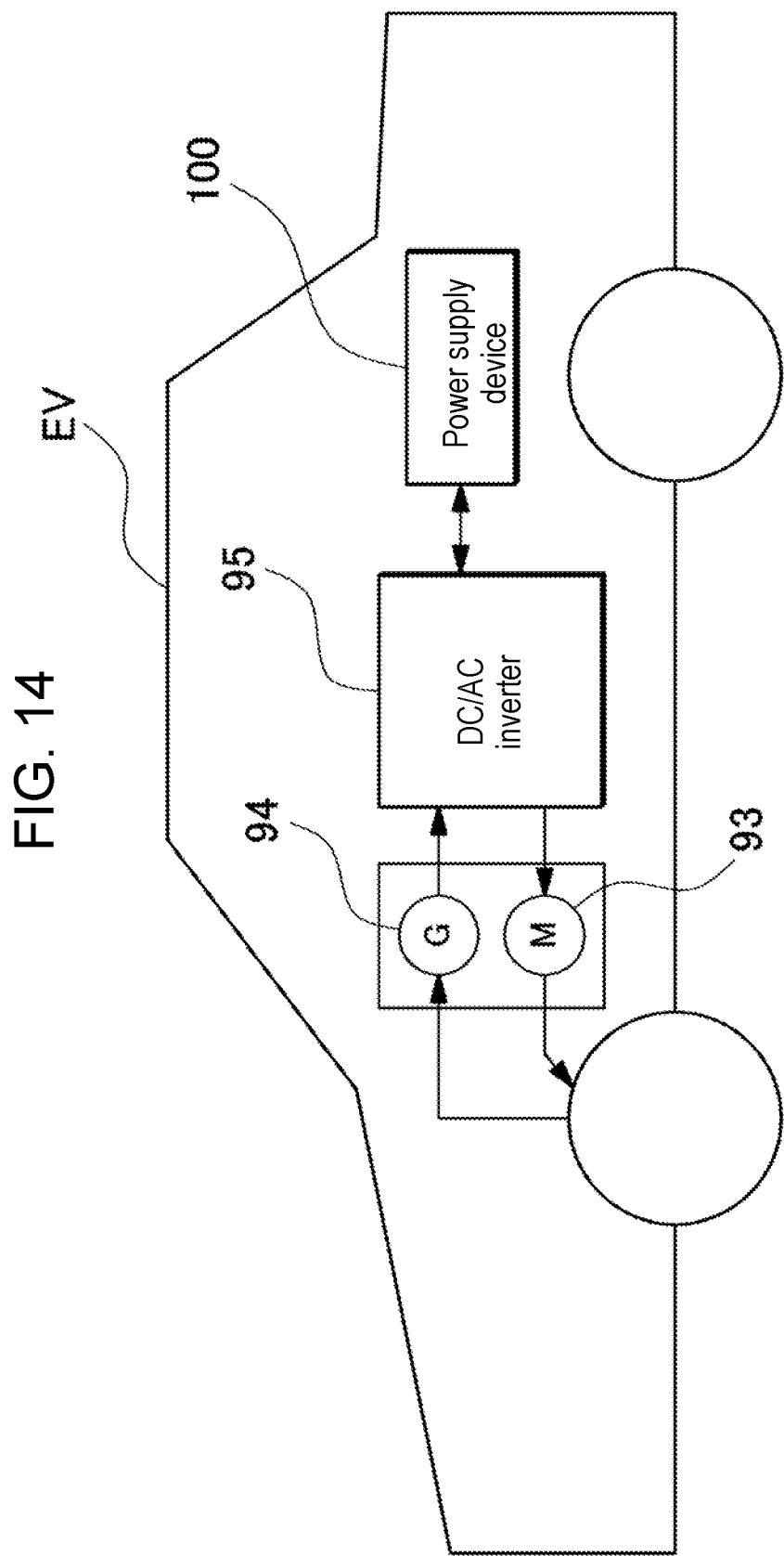
FIG. 14 is a block diagram showing an example in which a power supply device is mounted in an electric car traveling only by a motor.
Figure 15:
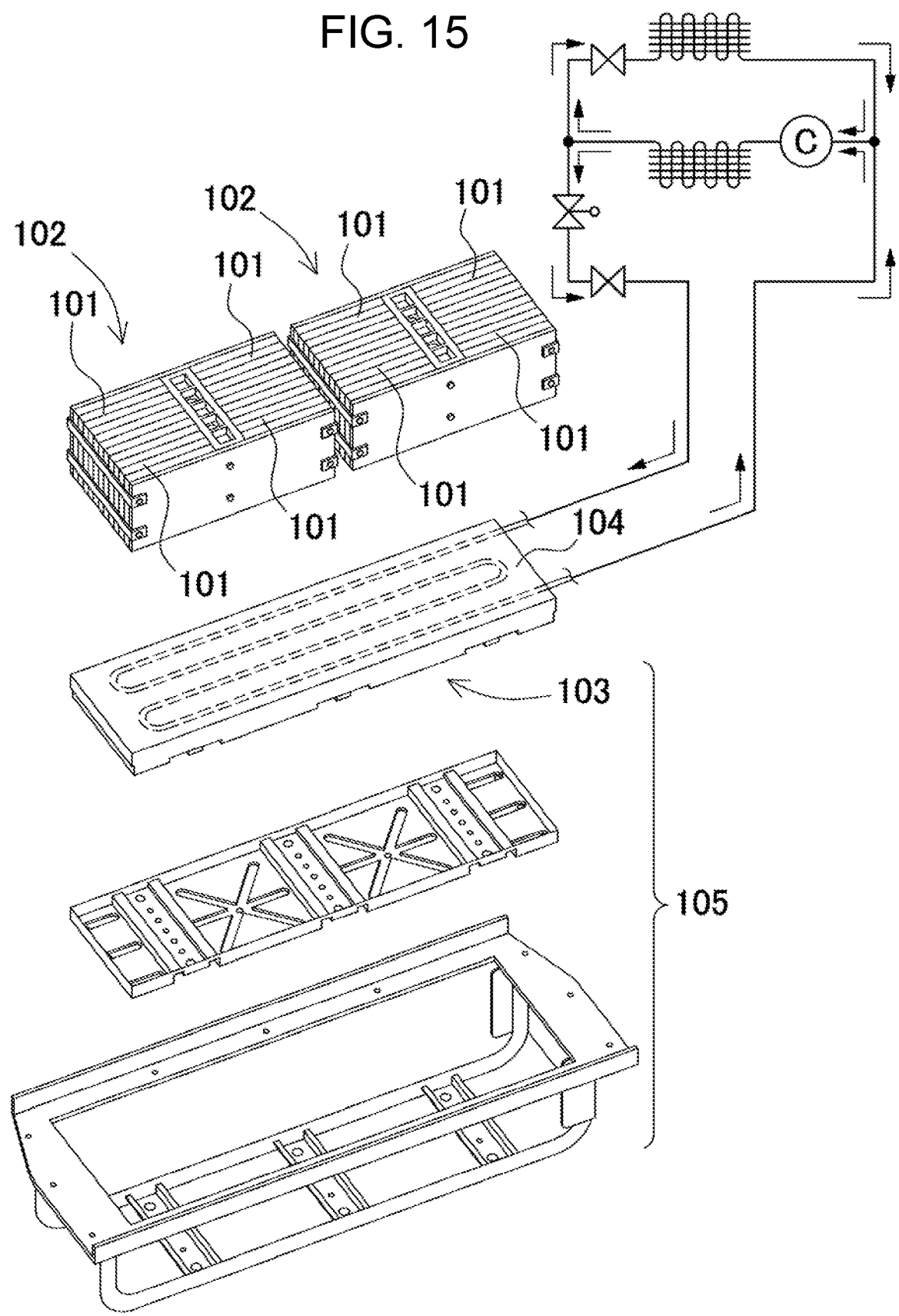
FIG. 15 is an exploded perspective view of a conventional power supply device.
Figure 16:
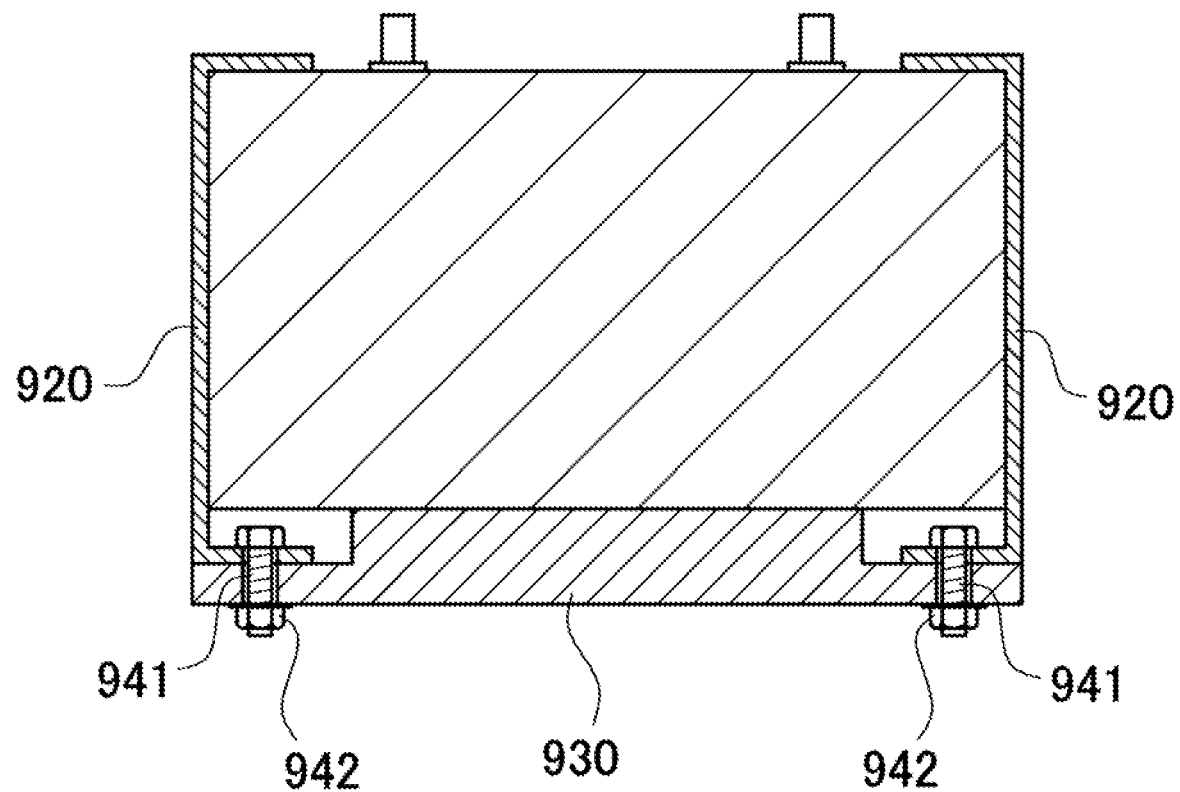
FIG. 16 is a sectional view in a state where a conventional cooling plate and a conventional assembled battery are connected.
Figure 17:
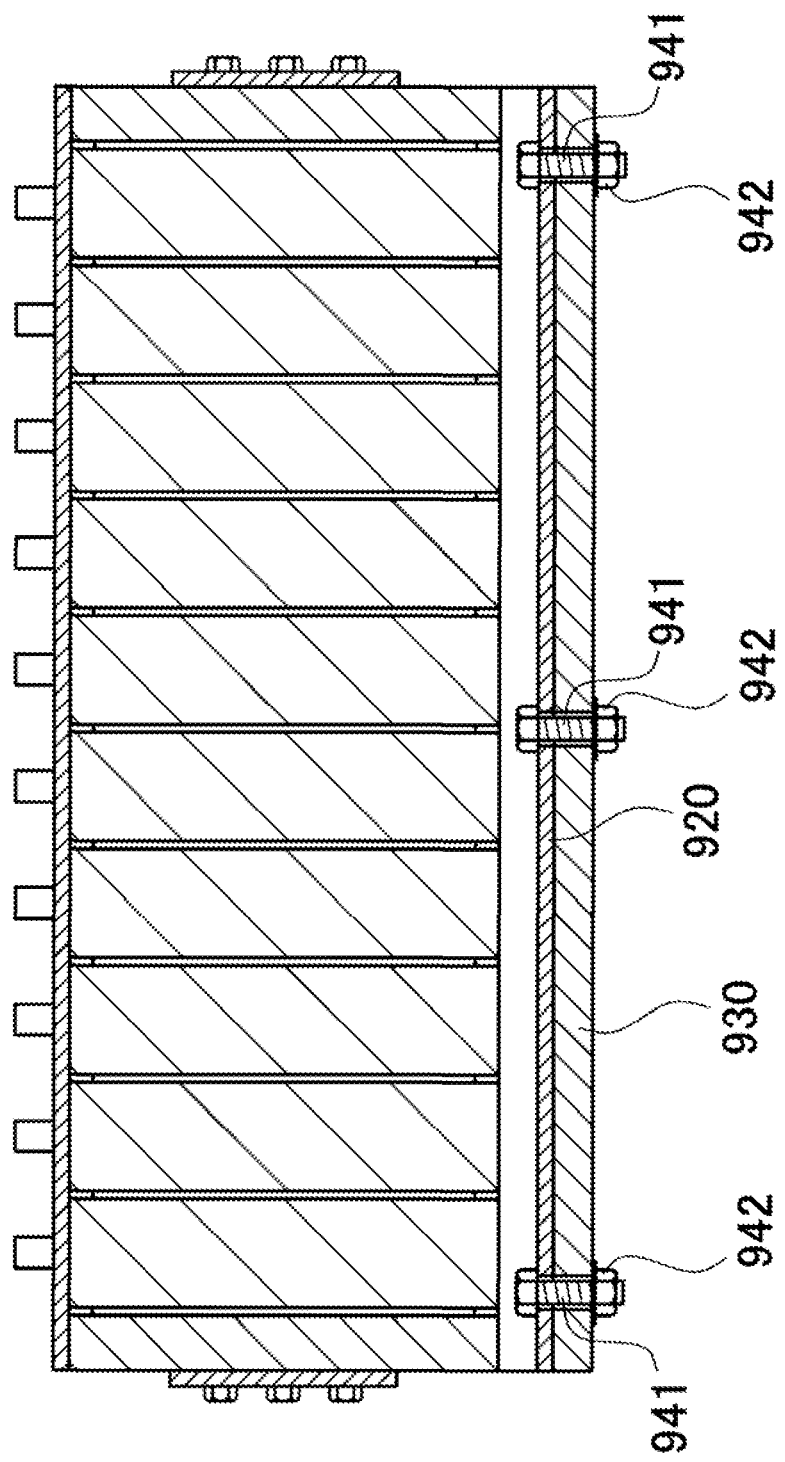
FIG. 17 is a sectional view in a state where a conventional cooling plate and a conventional assembled battery are connected.

FIG. 14 shows an example in which a power supply device is mounted in an electric car traveling only by a motor. Vehicle EV equipped with a power supply device that is shown in this drawing includes: motor 93 for travel that makes vehicle EV travel; power supply device 100 for supplying power to motor 93; and power generator 94 for charging the battery in power supply device 100. Motor 93 receives power from power supply device 100 and is driven. Power generator 94 is driven by energy when regenerative braking is applied to vehicle EV, and the battery of power supply device 100 is charged.

Exemplary embodiments and examples of the present invention have been described with reference to the drawings. The exemplary embodiments and examples show devices for embodying the technical ideas of the present invention. The present invention is not limited to the above-mentioned devices. In the present description, members shown in the scope of claims are not limited to the members of the exemplary embodiments. Especially, the sizes, materials, and shapes of the components and relative arrangement between the components, which are described in the exemplary embodiments, do not limit the scope of the present invention but are simply explanation examples as long as there is no specific description. The sizes and the positional relation of the members in each drawing are sometimes exaggerated for clearing the explanation. Furthermore, in the above-mentioned explanation, the same names or the same reference marks denote the same members or same-material members, detailed description is appropriately omitted. Furthermore, regarding the elements constituting the present invention, a plurality of elements may be formed of the same member, and one member may serve as the plurality of elements. Conversely, the function of one member may be shared by the plurality of members.

A power supply device according to the present invention can be suitably used as power supply devices of plug-in hybrid vehicles that can switch between the EV drive mode and the HEV drive mode, hybrid electric vehicles, electric vehicles, and the like. The power supply device can be appropriately used for the following applications: a backup power supply device mountable in a rack of a computer sever; a backup power supply device used for wireless base stations of mobile phones; a power source for storage used at home or in a factory; an electric storage device combined with a solar battery, such as a power source for street lights; and a backup power source for traffic lights.

The invention claimed is:

1. A power supply device comprising:
  a battery stacked body including a plurality of stacked secondary battery cells;
  a fixing part configured to fix the battery stacked body;
  a fastening assistance plate having the same linear expansion coefficient as the fixing part;
  a fixing plate disposed between the fixing part and the fastening assistance plate, and having one surface on which the battery stacked body is disposed, a linear expansion coefficient of the fixing plate being different from that of the fixing part; and
  a plurality of screw connected members passing through the fixing part, the fixing plate, and the fastening assistance plate,
  wherein each of the plurality of screw connected members has a seating surface on which a frictional force caused by an axial force operates, and the seating surface of each of the plurality of screw connected members is in contact with the fixing part or the fastening assistance plate,
  wherein the fixing part and the fastening assistance plate are made of a first metal, and the fixing plate is made of a second metal different from the first metal, and
  wherein the fixing part and the fastening assistance plate are made of Fe-based metal as the first metal, and the fixing plate is made of aluminum as the second metal different from the first metal.

2. The power supply device according to claim 1, further comprising:
  a pair of end plates disposed at both ends in a stacked direction of the battery stacked body; and
  a battery fastening member fastened to the pair of end plates,
  wherein the fixing part is formed at the battery fastening member.

3. The power supply device according to claim 2, wherein the battery fastening member has a main surface which extends along one surface of the battery stacked body, and a lower end bent board which is bent in a sectional L-shape at a lower end of the battery fastening member along a longitudinal direction of the main surface, and
the fixing part is formed at the lower end bent board.

4. The power supply device according to claim 1, wherein each of the plurality of screw connected members includes a bolt and a nut.

5. The power supply device according to claim 4, wherein the fastening assistance plate is disposed in at least one row-shape, and has a plurality of through holes through which the plurality of screw connected members respectively pass.

6. The power supply device according to claim 5, wherein the fixing plate has a recess at which the fastening assistance plate is disposed.

7. The power supply device according to claim 1, wherein the fixing part and the fastening assistance plate are made of the same metal.

8. The power supply device according to claim 7, wherein each of the plurality of screw connected members has the same linear expansion coefficient as the fixing part.

9. The power supply device according to claim 8, wherein the plurality of screw connected members and the fixing part are made of the same metal.

10. The power supply device according to claim 1, wherein the fixing plate includes a heat radiation plate which is thermally connected to the battery stacked body.

11. The power supply device according to claim 10, wherein a coolant is circulated inside the heat radiation plate.

12. A vehicle comprising the power supply device according to claim 1.